United States Patent [19]

Bornhorst

[11] 4,392,187

[45] Jul. 5, 1983

[54] COMPUTER CONTROLLED LIGHTING SYSTEM HAVING AUTOMATICALLY VARIABLE POSITION, COLOR, INTENSITY AND BEAM DIVERGENCE

[75] Inventor: James M. Bornhorst, Duncanville, Tex.

[73] Assignee: Vari-Lite, Ltd., Dallas, Tex.

[21] Appl. No.: 239,367

[22] Filed: Mar. 2, 1981

[51] Int. Cl.³ .............................................. F21P 3/00
[52] U.S. Cl. ...................................... 362/233; 362/85; 362/239; 362/286; 362/293; 362/319; 362/386; 362/419; 364/400
[58] Field of Search ................... 362/3, 11, 16, 17, 18, 362/85, 125, 227, 231, 232, 233, 234, 236, 238, 239, 243, 250, 285, 286, 287, 293, 296, 302, 319, 305, 386, 419; 364/525, 514, 400

[56] References Cited

U.S. PATENT DOCUMENTS

| | | |
|---|---|---|
| 1,820,899 | 8/1931 | Greenewalt . |
| 2,009,145 | 7/1935 | Nathan . |
| 2,192,520 | 3/1940 | Levy et al. . |
| 2,214,728 | 9/1940 | Gille et al. . |
| 2,625,851 | 1/1953 | Gelb . |
| 2,659,038 | 11/1953 | Heyer ................................ 362/233 |
| 2,660,926 | 12/1953 | Talley . |
| 2,687,669 | 8/1954 | Bolsey . |
| 2,841,065 | 7/1958 | Gage et al. . |
| 2,911,519 | 11/1959 | Phillips et al. . |
| 2,950,382 | 12/1956 | Hatch . |
| 2,951,430 | 9/1960 | Dumke et al. . |
| 3,045,208 | 4/1961 | Tiberui . |
| 3,107,578 | 10/1963 | Engelage . |
| 3,184,307 | 8/1965 | Letzer . |
| 3,375,362 | 3/1968 | Klippert . |
| 3,382,024 | 5/1968 | Councilman . |
| 3,515,800 | 6/1970 | Ebihara et al. . |
| 3,529,889 | 2/1970 | Demey . |
| 3,783,263 | 1/1974 | Cruse ................................ 362/233 |
| 3,833,295 | 9/1974 | Bebb et al. . |
| 3,845,351 | 10/1974 | Ballmoos et al. ................... 315/293 |
| 3,883,243 | 5/1975 | Weisglass et al. . |
| 3,898,643 | 8/1975 | Ettlinger . |
| 3,912,361 | 10/1975 | Bentley . |
| 4,037,097 | 7/1977 | Stillman et al. . |
| 4,043,646 | 8/1977 | Heine et al. . |
| 4,112,486 | 9/1978 | Tovi . |
| 4,167,783 | 9/1979 | Mitchell . |

FOREIGN PATENT DOCUMENTS 1434052  4/1976  United Kingdom .

Primary Examiner—Donald P. Walsh
Attorney, Agent, or Firm—Jerry W. Mills

[57] ABSTRACT

A lighting system (10) is disclosed which includes a control panel (12) for operating a plurality of lights (14) by means of a single two conductor signal cable (18) and a power cable (20). Two embodiments (30, 110) of lights (14) are provided for use in the present lighting system. In the first embodiment, the light (30) includes four dichroic filters (58-64) mounted for pivotal motion on axes passing through the light path formed by light emanating from a lamp (50). The dichroic filters may be aligned with the light path, thereby eliminating the effect of the filters. The dichroic filters may be singly or in combination pivoted so that the light in the light path is incident on the dichroic filter at a predetermined angle to transmit a preselected color therethrough. Four primary color dichroic filters are employed. An integrating lens (100) is provided for homogenizing the color of the light. A projection lamp (50) may be employed with an elliptical mirror (52) which reflects light to converge at a focus (54). A collimating lens (56) is then used to align the light for passage through dimmer and douser units (94,90) and a focusing lens (104). The second embodiment (110) of the light (14) includes two color wheels (112,114) each having 32 apertures formed in their outer periphery. Thirty one of the apertures are filled with dichroic filters to permit a preselected color to be transmitted therethrough with one aperture left open for passing white light. A gobo wheel (126) and an intensity wheel (130) may also be provided. A zoom lens (134) may be provided. The lighting system (10) permits the color, intensity, divergence and pan and tilt of each of the lights to be adjusted from the control panel (12) for each cue in a show. The settings for each cue during a show may be stored in a memory and recalled to set the variable functions of each light when desired.

27 Claims, 17 Drawing Figures

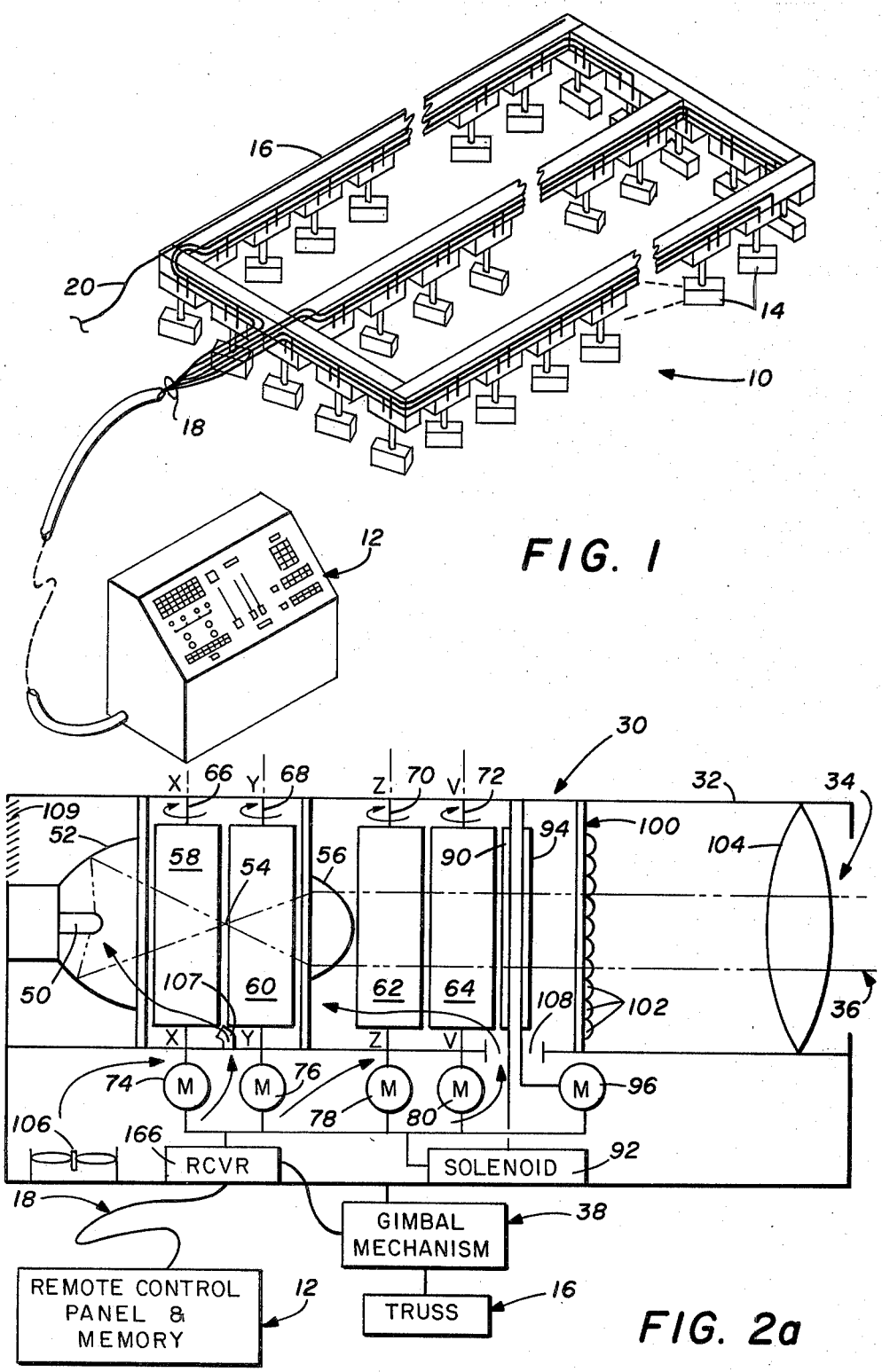

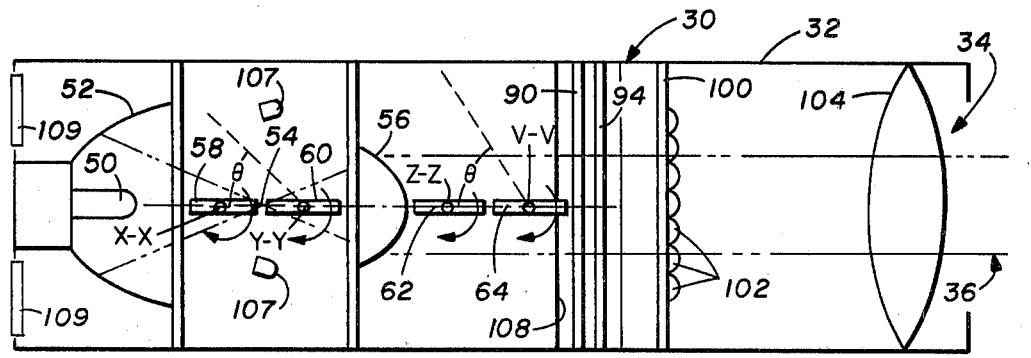
FIG. 2b
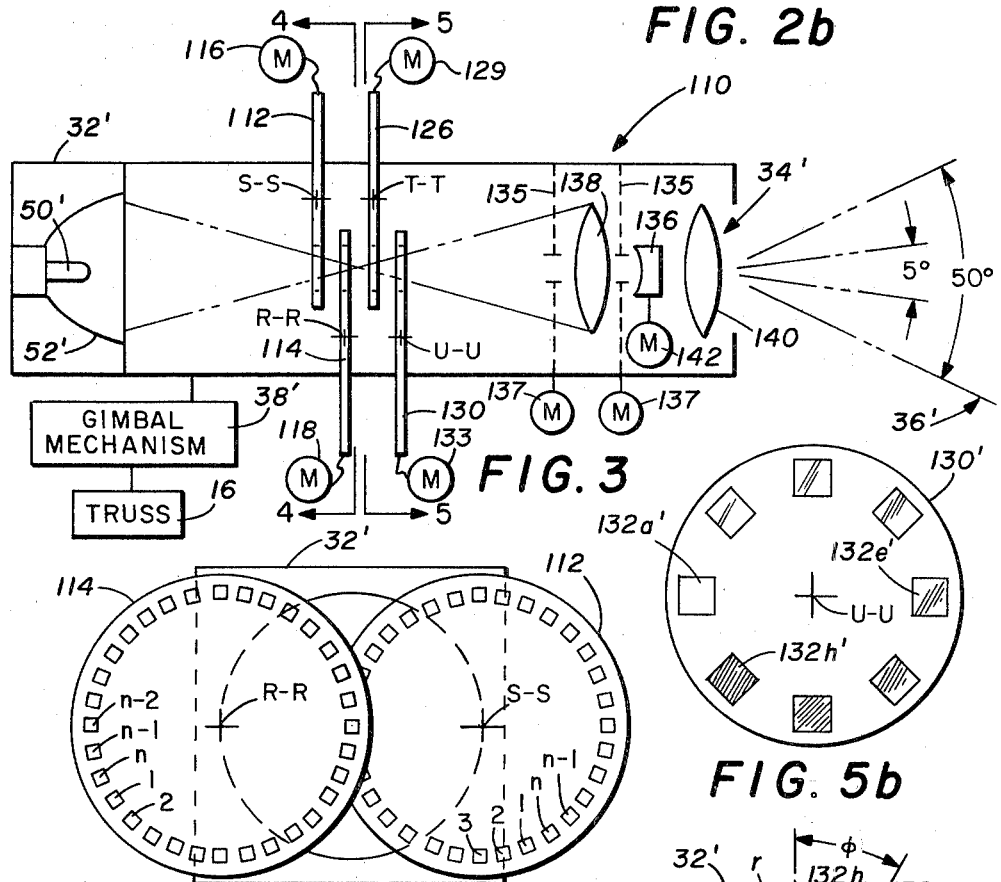

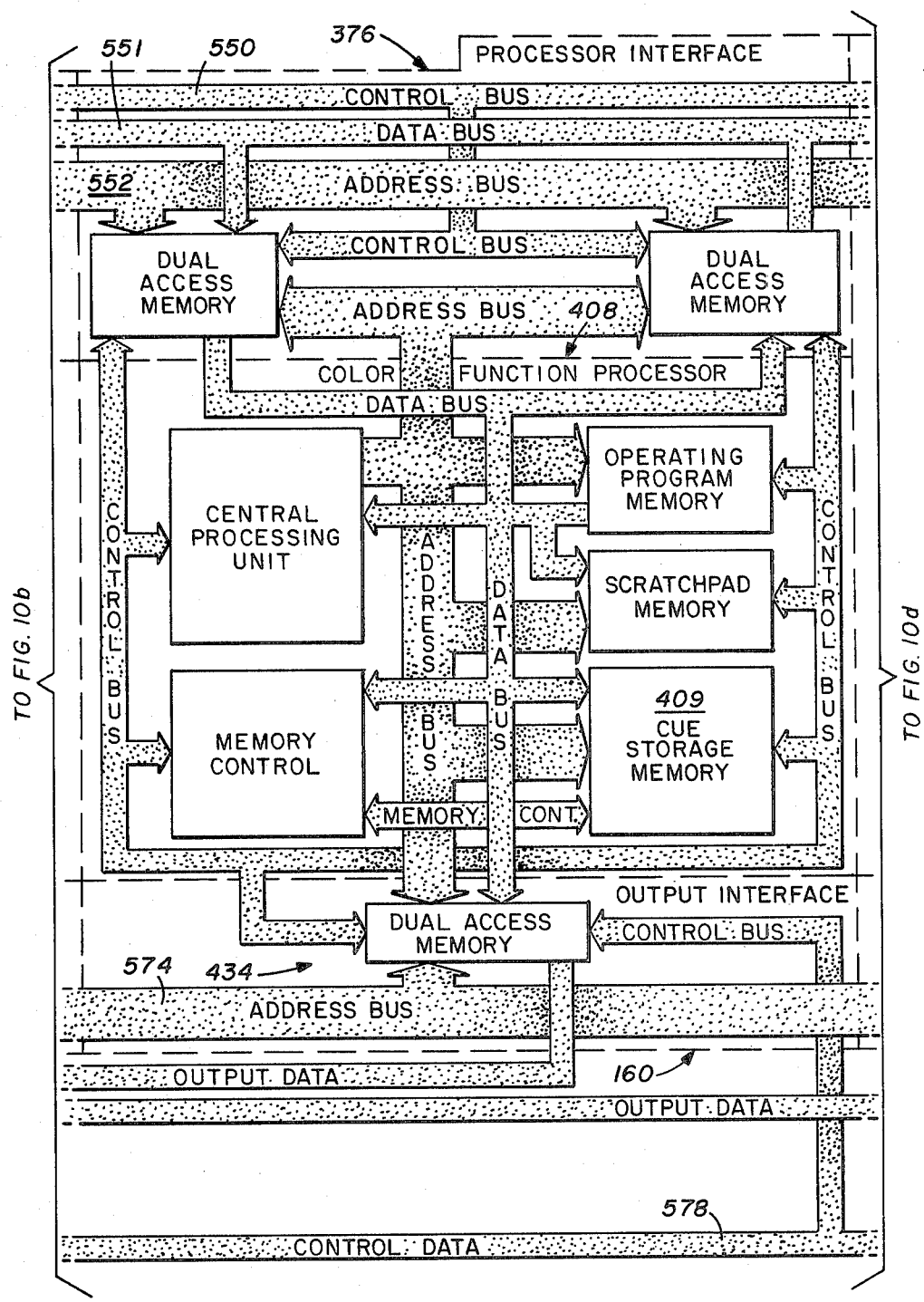

COMPUTER CONTROLLED LIGHTING SYSTEM HAVING AUTOMATICALLY VARIABLE POSITION, COLOR, INTENSITY AND BEAM DIVERGENCE

TECHNICAL FIELD

This invention relates to the illumination, in particular to the lighting of a stage or theatre.

BACKGROUND ART

In conventional lighting systems, individual light sources are typically hung from trusses or fixed structural members mounted in front of the stage, at the sides of the stage or over the stage. The light sources are adjusted to direct the light beam to a desired location on the stage and are then secured in that position by tightening bolts or other fasteners. A large sealed beam lamp of 1,000 to 1,500 watts run from a 110 volt AC line is typically employed to create the light. In addition to generating visible light, such lamps, generally noted as par lamps, generate a significant amount of infrared heat.

In a typical stage lighting plan, the light sources are employed in either of two fashions. Certain light sources may be used as a wash or general stage illumination. The remainder of the light sources are used as spots for highlighting specific positions on the stage, such as an actor's face.

The light beams emanating from each light source may be colored by the use of a colored celluloid gel. The gel is positioned within a frame which is slid into a receiver positioned at the end of the light source so that the beam passes through the colored gel. The gel functions to absorb the incident light other than the color desired. The absorbed light is transformed into heat which warps and discolors the gel, requiring frequent replacement as often as once every show.

Shutters are typically pivoted at the end of the light source to block out selected portions of the light beam to shape the incidence of the beam on the stage. In many cases, a mechanical iris may be provided in the light source to control the beam divergence. When a light source is used as a wash, a wide beam divergence is desired. However, when used as a spot, the light beam preferably is narrowed to a very small divergence.

The intensity of the light beam emanating from each light source is individually controlled by a large power dimmer. The power dimmers, in turn, are controlled by the main lighting control panel. The typical lighting system therefore requires a massive array of electrical cables, including cables connecting the control console with a power dimmer and cables interconnecting the power dimmer with the associated light source. It has also been found that the use of power dimmers to control the intensity of light has induced chop in the AC power line supplying the entire theater. This has been found to induce undesirable noise, such as distortion, hum etc. particularly during the performance of rock groups employing instruments relying on electrical input.

A typical performance, such as a rock concert or theatrical performance, may require a hundred or more individual lighting cues or lighting formats during the performance. Up to 500 separate lights may be necessary to light the entire performance. Usually 25% of these lights are used as wash and the remainder are used as specials. The large number of lights are necessitated as the light position, color, intensity and divergence must be preset prior to the performance.

Attempts have been made to automatically control a stage lighting system during a performance. U.S. Pat. No. 3,898,643 to Ettlinger, issued Aug. 5, 1975, discloses a system including a memory for storing the intensity level of the lights for each cue during a performance. The system may then set the intensity of the light through conventional power dimmers in an automatic sequence. However, this device merely transfers the manual operation of power dimmers to an automatic system which, while relieving an operator of substantial work during the performance, necessitates still more complex and costly equipment in the system.

DISCLOSURE OF THE INVENTION

In accordance with the present invention, a lighting system is provided which includes at least one light source for producing a directable beam of light mounted for pivotal motion. Pivoting mechanisms are provided for pivoting the light source to a preselected position. A controller is provided for input of a coded address representing a selected one of the light sources and data representing the preselected position of the light source. A Transmitter is provided for transmitting the coded address and data to a receiver. The receiver is provided for reading the coded address, identifying the light source corresponding to the coded address and reading the positioning data and activating the pivoting mechanism of the selected one of the light sources to pivot the light source to the preselected position.

In accordance with another aspect of the present invention, a light source for producing a directable beam of light is provided. The light source includes a frame and a lamp for producing light positioned within the frame. At least one dichroic filter is pivotally mounted within the frame for pivotal motion into the light path for transmitting light of a preselected color, the angle of incidence of the light on the dichroic filter being variable to alter the color transmitted as the dichroic filter is pivoted.

In accordance with yet another aspect of the present invention, a light source for producing a directable beam of light is provided which includes a frame and a lamp for producing a light position within the frame. A color wheel is rotatably mounted on the frame and has at least one dichroic filter mounted in the periphery thereof, the wheel being rotatable to position the dichroic filter across the light path transmitting a preselected color.

In accordance with yet another aspect of the present invention, a lighting system for use in lighting an area is provided. The lighting system includes at least one light source for producing a directable beam of light, each of the light sources having a mechanism to position the light source, and a mechanism to vary the color of the beam of light produced. A controller is provided for inputing information representing the desired position and color of a selected one of the light sources. A transmitter is provided for transmitting the input information and a receiver is provided associated with the selected one of the light sources for activating the mechanisms controlling the position and color of the selected one of the light sources to correspond to the information transmitted. Mechanisms to vary the intensity and divergence of the light beam produced may also be provided and the input information contains data representing the desired setting of these functions.

BRIEF DESCRIPTION OF DRAWINGS

A more complete understanding of the invention may be had by reference to the following Detailed Description when taken in conjunction with the accompanying Drawings wherein:

FIG. 1 is a perspective view of a lighting system forming the present invention;

FIG. 2a is a vertical cross-sectional view of a first embodiment of a light source forming the present invention;

FIG. 2b is a horizontal cross-sectional view of the first embodiment of the light source;

FIG. 3 is a vertical cross-sectional view of a second embodiment of a light source forming the present invention;

FIG. 4 is a vertical cross section of the second embodiment of the light source taken along line 4—4 in FIG. 3 in the direction of the arrows;

FIG. 5 is a vertical cross section of the second embodiment of the light source taken along line 5—5 in FIG. 3 in the direction of the arrows;

FIGS. 10a-f are a detailed schematic of the control panel of the lighting system; and FIG. 11 illustrates the interrelation of FIGS. 10a-f.

DETAILED DESCRIPTION

Figure 6:
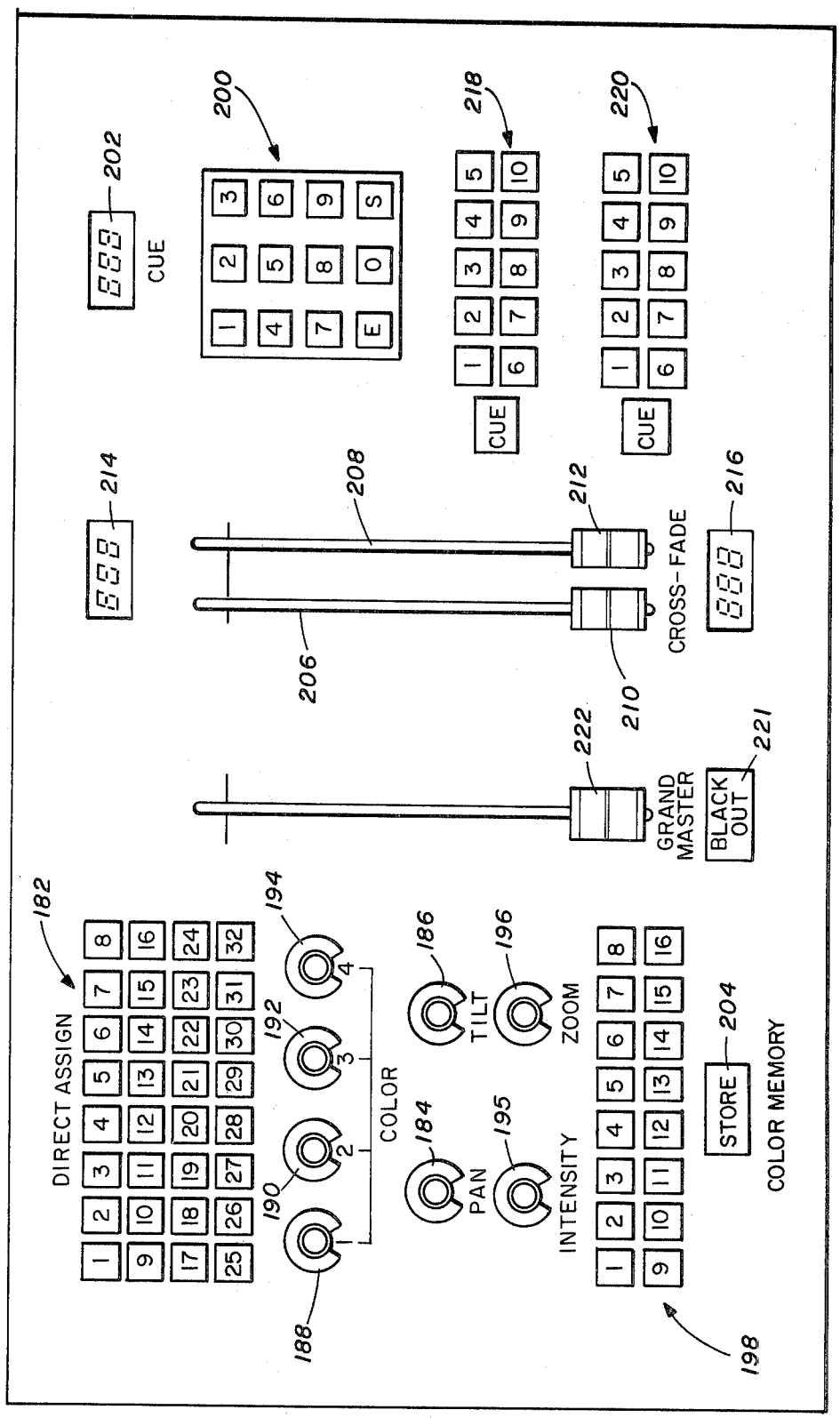
FIG. 6 is an illustration of a control panel for use with the present invention.

Referring now to the Drawings, wherein like reference characters designate like or corresponding parts throughout several views, FIG. 1 illustrates a lighting system 10 forming the present invention. The lighting system 10 may be used to light a stage or other forum where directable light is desired. For example, the lighting system 10 may be used to light a rock concert or a theatrical performance.

As will be explained in greater detail hereinafter, the lighting system 10 includes a remote control panel 12 for controlling the light sources 14 mounted on a truss 16 above, in front or to the side of the stage to be lit. Each light source 14 may be positioned and the light beam produced thereby varied in color, intensity and beam divergence from the remote control panel 12. If the performance being lit includes a number of scenes, or individual lighting changes generally termed as cues, the remote control panel 12 includes a memory for recalling the position, color, intensity and beam divergence of each light source 14 for each separate cue and the remote control panel 12 will automatically set up an entire cue by the activation of a single control on the control panel 12. Each function described above is accomplished with only a single two conductor data link or signal cable 18 interconnecting the control panel 12 and truss 16 and a power cable 20.

The first embodiment of light source 14 is illustrated in FIGS. 2a and 2b as light 30. The light 30 includes a rigid frame 32 having an aperture 34 formed in one end thereof for passage of the light beam 36. The frame 32 and components therein are pivotally mounted to the truss 16 by a gimbal mechanism 38.

The gimbal mechanism 38 pivotally supports the frame 32 for motion in two mutually perpendicular planes. The frame 32 may move in a horizontal plane or pan across a stage and in a vertical plane or tilt. The gimbal mechanism 38 also includes motor for independently panning and tilting the frame 32 in discrete increments in response to signals generated by the remote control panel 12. The motors permit the light beam 36 to be aimed at any desired location on the stage. In the preferred embodiment servo motors are used in gimbal mechanism 38.

A lamp 50 is positioned within frame 32 adjacent one end thereof. The lamp 50 produces white light, or light across substantially the entire visible spectrum. In the preferred embodiment, the lamp 50 may comprise a common projection lamp as used in movie projectors and the like having a 110 volt AC input with a power consumption of approximately 350 watts. This type of lamp has the advantage of very low infrared radiation generation, thereby avoiding the generation of excess heat within the light 30. An elliptic mirror 52 is positioned about the lamp 50 to reflect light incident thereon to converge at a focus 54 within the frame 32. After convergence at focus 54, the light diverges and enters a collimating lens 56 which collimates light incident thereon to form the light beam 36.

Dichroic filters 58 and 60 are pivotally mounted to the frame 32 on either side of focus 54. Two additional dichroic filters 62 and 64 are pivotally mounted to frame 32 on the side of collimating lens 56 opposite focus 54. Dichroic filters are available commercially, such as those sold by the Technical Products Division of Optical Coating Laboratory, Inc. of P.O. Box 1599, Santa Rose, Calif. A dichroic filter is a multiple layered optical film having a glass, pyrex or quartz base. The alternate layers have low and high indexes of refraction, respectively. Dichroic filters work on an interference principle, separating two colors out of a white light source, one color being transmitted and the other color, the complement of that transmitted, being reflected. The transmitted color depends upon the type of material used in the layers and its refractive index, the thickness of each layer, the number of layers and the angle of incidence of the white light source striking the surface of the filter. By varying the angle of incidence of white light on a given filter, a preselected range of color spectrum may be produced.

The dichroic filters 58-64 are preferably formed of multiple thin layers of material and may have a circular, rectangular or other shape. The filters therefore have a thickness of a relatively small dimension and a relatively large surface for incidence of light. Dichroic filter 58 is mounted for pivotal motion about an axis X—X by shaft 66. As can be seen with reference to FIG. 2b, the axis X—X extends through the center of the light path. Dichroic filters 60, 62 and 64 are similarly mounted for pivotal motion about axis Y—Y, Z—Z and V—V, respectively, about shafts 68, 70 and 72, respectively. Each dichroic filter may be pivoted about its associated shaft by means of a servo motor 74, 76, 78 or 80.

When the dichroic filters are aligned with the light path, as shown in FIG. 2b, no influence on the color is created and the filters do not significantly interfere with the light path. Therefore, a white light beam is created for use as a spot or other desired use. As a given dichroic filter is pivoted so that the angle of incidence of the light, θ, increases above 0, the filter moves across the light path and transmits a colored beam with the color dependent on the angle θ. The four filters may be chosen to transmit four dominant colors. Filter 58 may transmit blue, filter 60 green, filter 62 red and filter 64 yellow. However, each individual filter will transmit a range of spectrum as θ is varied. At low values of θ, white light spills around the edges of the filters, diluting the transmitted beam to produce pastel or un-saturated shades of color as the beam is passed through an integrating lens 100 described hereinafter to homogenize the light beam. In the preferred embodiment, the blue and green filters are positioned furthest from lamp 50 to form dichroic filters 62 and 64. This permits desirable pastel or unsaturated shades of color to be produced when low values of a θ are present. The permutations of color in the light beam 36 in passing light through a filter or multiple filters are theoretically infinite dependent only on the relative position of the filters. In one application of the present invention, 4,000 permutations of color are possible.

A douser unit 90 is positioned within the frame 32. The douser unit 90 acts to permit the light beam 36 to pass therethrough when open but substantially cuts off the light beam 36 when closed. It therefore acts like a shutter to block light from passing from the light 30, but permits the light beam to be almost instantaneously restored by opening the douser unit. In the preferred embodiment, the douser unit 90 is in the form of a mechanical shutter. The shutter is controlled by a solenoid 92 which may be activated to either close or open the shutter to control the light beam. The shutter is designed so that the shutter is closed upon deactivation of the solenoid. This features prevents a light beam from emenating from a light when the light is malfunctioning, or the data transmitted to the light is in error to prevent improper lighting.

In close proximity with douser unit 90 is a dimmer unit 94. The dimmer unit 94 dims or decreases the intensity of light beam 36 to vary the mood or impact of the light on the stage. The dimmer unit 94 is controlled by a servo motor 96.

An integrating lens 100 is provided to mix the light passing through the dichroic filters to insure a uniform color. The integrating lens 100 is formed of a large number of small spherical lens 102 mounted on a flat transparent surface which acts to homogenize any light passing therethrough. Finally, light beam 36 passes through a focusing lens 104 prior to exiting frame 32 through aperture 34 to light a desired location on a stage.

The light 30 may include a cooling fan 106 mounted in the lower base thereof. The cooling fan 106 forces outside air into the lower portion of the light to cool the electric components such as receiver 166 and servo drive 168. A portion of the airflow is directed through nozzles 107 at the lamp 50 to cool the lamp directly. The remainder of the air passes forward to a slot 108 adjacent the douser and dimmer units and passes to the upper portion of the light 30 to cool the lenses and dichroic filters. The air passing through slot 108 and issuing from the nozzles 107 exits the light 30 through a grating 109 at the rear of light 30 adjacent the elliptic mirror 52.

The second embodiment of the light source 14 is illustrated in FIGS. 3-5 and comprises a light 110. Certain portions of light 110 are identical to portions of the light 30. These portions are identified by reference numerals indicating the identical portion in light 30 with a superscript '.

The frame 32' is also gimbaled on a gimbal mechanism 38'. The mechanism 38' permits the frame 32' and light beam 36' emanating therefrom to be panned and tilted across a stage.

The lamp 50' produces white light which is reflected off the eliptical mirror 52' to converge at a focus 54' within the frame 32' of the light 110. Color wheels 112 and 114 are rotatably mounted to frame 32' for rotation about axes R—R and S—S. The axes R—R and S—S are generally aligned with the path of light travel in the light 110 and are positioned so that the light falls on portions of the outer periphery of both color wheels 112 and 114, as best illustrated in FIG. 4.

Each color wheel 112 and 114 has a plurality of apertures numbered from 1 to n distributed about the outer periphery of the wheel. Each aperture may be centered across the light path. The color wheels 112 and 114 are positioned sufficiently close to the focus 54' so that substantially all the light from lamp 50' passes through the aperture centered on the path of the light and the area of the apertures may be minimized.

At least one aperture in each wheel 112 and 114 is clear to permit passage of the light therethrough without interference. However, the remainder of the apertures have individual dichroic filters mounted therein, each filter permitting a single color to be transmitted therethrough. Each color wheel may include sufficient dichroic filters to individually provide a wide spectrum of color or, in combination with the other color wheel, provide a number of color permutations. In the preferred construction, each color wheel 112 and 114 will have 32 apertures, one being clear and 31 having dichroic filters mounted therein. This permits almost 1000 permutations of color to be induced in the light beam 36' issuing from light 110 by rotating the two color wheels 112 and 114 by motor means 116 and 118, respectively.

A gobo wheel 126 is rotatably mounted on frame 32' for rotation about axis T—T. The gobo wheel 126 has apertures 128a-d formed in the outer periphery thereof through which substantially all the light diverging from focus 54' may pass therethrough when an aperture is centered across the light path. Again, aperture 128a does not interfere with the light travel. The apertures 128b-d may have characters or other designs meant to project a silhouette or other background design onto the stage. A motor means such as servo motor 129 is used to rotate the gobo wheel 126 to position an aperture across the beam.

A light intensity wheel 130 is rotatably mounted to frame 32' for rotation about an axis U—U. In the preferred embodiment, the outer periphery of intensity wheel 130 is formed of a material permitting a percentage of light incident thereon to be transmitted therethrough which varies as a linear function of the angle $\phi$ measured from a reference radius r. The wheel 130 may be a transparent wheel with a reflective coating around the periphery that varies in reflectance from 0% to approximately 100%. This type of wheel is referred to as a circular variable neutral density wheel. Such a wheel is sold by Melles Griot, 1770 Kettering St., Irvine, Calif. as a Circular Linear-Wedge N-D Filter. The periphery is sized to permit the entire light beam to be incident thereon. Portion 132a does not interfere with light passage therethrough. Portions 132b-h have progressively smaller percentages of incident light being transmitted therethrough and reflecting higher percentages of the incident light diverging from focus 54' back into the light. The wheel 130 has been divided into 7 portions 132a–b merely for ease of discussion. The variation of φ permits the light transmitted to be varied continuously from virtually 100% to 0% of the incident light. Preferably, the wheel 130 in portion 132h permits no light to be transmitted therethrough, forming an effective means to cut off the light beam 36'. A servo motor 133 is used to rotate a desired portion across the light path.

In a first modification shown in FIG. 5b, light intensity wheel 130 may include a number of apertures formed in the outer periphery thereof. Each aperture is sized to permit the entire light beam to pass therethrough. Reflective mirrors are mounted in each of the apertures. The mirrors 132'a–h distributed about the wheel 130' have progressively smaller percentages of incident light being transmitted therethrough and reflect higher percentages of the incident light diverging from focus 54' back into the light. A servo motor may be used to rotate the intensity wheel 130 to position a mirror having a desired percentage of transmission across the light beam. Preferably, one mirror transmits substantially 100% of the light incident thereon to provide a full intensity light beam.

In a second modification, a mechanical iris 135 would be mounted adjacent the lens 138 on either side thereof as illustrated in FIG. 3 in phantom line. The mechanical iris 135 would be controlled by a servo motor 137 which would operate to extend or contract the iris to vary the intensity of the light beam emanating from light 110.

A three element zoom lens 134 is positioned within the frame 32' for controlling the divergence of the light beam 36' issuing from the light 110. The three element lens includes a movable center lens 136 positioned between fixed outer lens 138 and 140. In the preferred construction, the zoom lens assembly 134 will permit variation of the beam divergence from an angle of 5 degrees to an angle of 50 degrees as illustrated in FIG. 3. The movement of the center element 136 is controlled by a servo motor 142.

As is readily apparent from the description above and the referenced figures, both lights 30 and 110 permit variation of the position, color, and intensity of a light beam. Light 110 also permits variation of the beam divergence. These functions may be remotely controlled in a manner described hereinafter. The lights 30 and 110 are a significant improvement over the prior art lights. The dichroic filters mounted therein for inducing color in the light beam permit a large number of permutations of shades and hues to be created, thereby amplifying the artistic scope available to the director. The dichroic filters transmit light incident thereon and reflect the complement of the color of the transmitted beam. Therefore, no light is absorbed and transformed to heat as found in the prior art use of celluloid gels. The use of a relatively low power projection lamp in lights 30 and 110 substantially reduces the generation of infra-red radiation which causes high power consumption and heat buildup within prior art devices.

Figure 7:
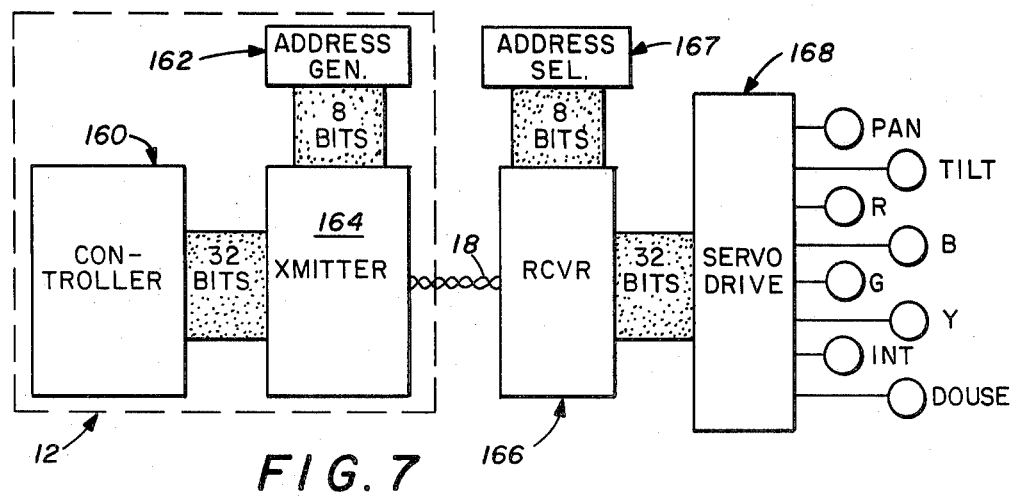
FIG. 7 is a flow diagram illustrating the major functions in the lighting system of the present invention.

A flow chart of the light system 10 is shown in FIG. 7. Information representing the desired position, color, intensity and beam divergence of a light source 14 is manually entered by an operator or stored in a memory in the controller 160. Each individual light source is identified by a code in address 162. This code identifies the particular light or series of lights to which a set of variable functions is assigned. The information input to controller 160 is placed in a 32 bit parallel format and transferred to a transmitter 164. While a 32 bit data format is suitable for the system 10, it will be understood that the data format would be expendable or contractable as needed to achieve a desired control resolution. The selected light source is represented in address 162 by 8 bits of parallel data which is transferred into transmitter 164. Transmitter 164 translates the parallel data into a 40 bit serial format for transmission along a two conductor twisted signal cable 18. The signal cable 18 may comprise common microphone cable. The first 8 bits of the serial data transmitted represents the address of the light source.

Signal cable 18 represents an open loop system, having receivers 166 branched therefrom associated with each of the light sources 14. Each receiver 166 translates the first 8 bits of serial data to identify the particular light source represented by the data in address 167. The address select 167 includes a number of thumb operated switches for determining the address of the particular light source. If a light source mounted on the truss is rendered inoperable, the light source may be rapidly replaced with a new light source by setting the address of the new light source to correspond with the address of the failed light source. If the associated light source corresponds to the address in the data transmitted, the remaining 32 bits of data are transferred to servo drives 168 and translated from digital information to analog information for controlling the pan and tilt, color, intensity and beam divergence of the light sources. In the embodiment illustrated in FIG. 7, four dichroic filters having the dominant colors, red, blue, green and yellow are employed represented by the letters R, B, G and Y.

The manual input by an operator of the information representing the position, color, intensity and beam divergence of the light system 10 is best discussed with reference to the control panel 12 illustrated in FIG. 6. The control panel 12 illustrated in FIG. 6 is designed to control 32 separate light source such as lights 30 represented by the 32 keys in the direct assign group 182. The operator may address any one of the 32 light source by depressing its associated key or a number of light sources by sequentially depressing the key representing each of the light sources. The position of the selected light source or sources may be adjusted in unison by rotating the pan and tilt controls 184 and 186. The pan and tilt controls activate the gimble mechanism 38 associated with a light 30. Color controls 188, 190, 192 and 194 are provided for adjusting the angle θ of each of the four dichroic filters 58, 60, 62 and 64. In a control panel adapted for use with light 110, the color controls 188–194 will be replaced by two 32 position switches or other means for rotating the desired aperture of the two color wheels 112 and 114 across the path of the light beam.

The intensity control 195 may be used to control the intensity of the light beam from light 30 if a mechanism is provided on the light to do so. When control panel 12 is adapted for use with the light 110, the intensity control 175 would rotate the intensity wheel 130 to adjust the intensity of the light beam as desired.

The zoom control 196 is inactive when control panel 12 is associated with lamp 30. When control panel 12 is adapted for use with light 110, the zoom control may be used to adjust the position of the traveling lens 136.

To avoid adjusting the color of each light manually, a color memory 198 may be provided which associates individual colors with the keys numbered 1 through 16. For example, the color controls 188, 190, 192 and 194 may be adjusted to create a blue light beam. By depressing a selected button, such as 4, in color memory 198 and subsequently the store key 204, the setting of the filters to provide a blue light beam will be stored within the memory. The setting may be recalled by merely depressing the key 4 in color memory 198. This permits the operator to preprogram common colors so that one button operation will set a light to the desired color and avoid the necessity to address four controls for each color setting.

As noted previously, a concert or performance being lit typically has a number of light cues. The independent control of the variable functions in a light source 14 within the light system 10 permits a single light source to be used in a difference position, and with a different color, intensity and beam divergence for each cue. The cue control 200 is used to assign the information input regarding position, color, intensity and beam divergence to a particular cue. The cue selected is displayed on a display 202.

Having determined the position, color, intensity and beam divergence for a selected light source for a given cue, this information may be stored in a memory by depressing the store key S in cue control 200. The information stored may be recalled at any desired moment.

Having preset the information with respect to each of the 32 light sources for every cue in a performance, it is necessary to recall the information for each light source for the cues in sequence during the performance. This is accomplished by the use of cross fade controls 206 and 208. When the handle 210 of cross fade control 206 is moved adjacent the display 214, the light system 10 automatically recalls the information regarding each light source and activates the servo drives 168 to position the light sources, adjust the colors, intensities and beam divergences to the value set for the cue displayed in display 214.

As the handle 212 on the cross fade control 208 is moved toward the display 216, the light system 10 recalls the information regarding each light source for the cue displayed in display 216 and activates the servo drives 168 to set the light sources for the cue displayed in display 216.

At the beginning of a performance, the display 216 is typically set to zero and the display 214 is set to one. With the handles 210 and 212 in the position shown adjacent display 216, no stage lighting is provided. Both handles 210 and 212 are moved upward adjacent display 214, thereby setting the light sources for cue 1 and increasing the intensity of the lights to their full value when the handles abut display 214. The display 216 automatically resets to cue 2. At the end of the scene representing cue 1, the handles 210 and 212 are moved downward adjacent display 216 to fade out the settings of cue 1 and fade in the settings of cue 2. If a cue is desired out of numerical sequence, the cue control 220 may be activated to set a desired cue in either display 214 or display 216, the display elected being opposite the present position of the cross fade handles 210 and 212 so that the desired cue may be faded in by moving the handles toward the selected display. The cue control 220 is activated to elect a cue out of sequence by depressing the E key and depressing the keys corresponding to the desired cue. A blackout button 221 is provided for instantaneously darkening the stage by blocking the light beam from every light source. A grand master dimming control 222 is provided for reducing the lighting intensity from the value for a given cue to a total blackout.

A number of preset lighting cues may be desired. In particular, a general stage wash or other lighting setup may be commonly employed. Such a preselected cue may be stored in control panel 12 and recalled by depressing a key on either upper or lower cue controls 218 and 220. If, for example, a general wash cue has been preprogrammed into upper cue control 218 for recall by depressing key 5, the depression of key 5 will cause a letter P, representing preselected and the number 5 to appear in display 214 and the preset cue will be implemented as the cross fade handles 210 and 212 are moved adjacent display 214. In a similar manner, a preselected cue may be recalled from lower cue control 220 by depressing the associated key, which will cause the letter P and associated key number to be displayed in display 216 and implement the cue as the cross fade handles 210 and 212 are moved adjacent display 216.

Figure 9:
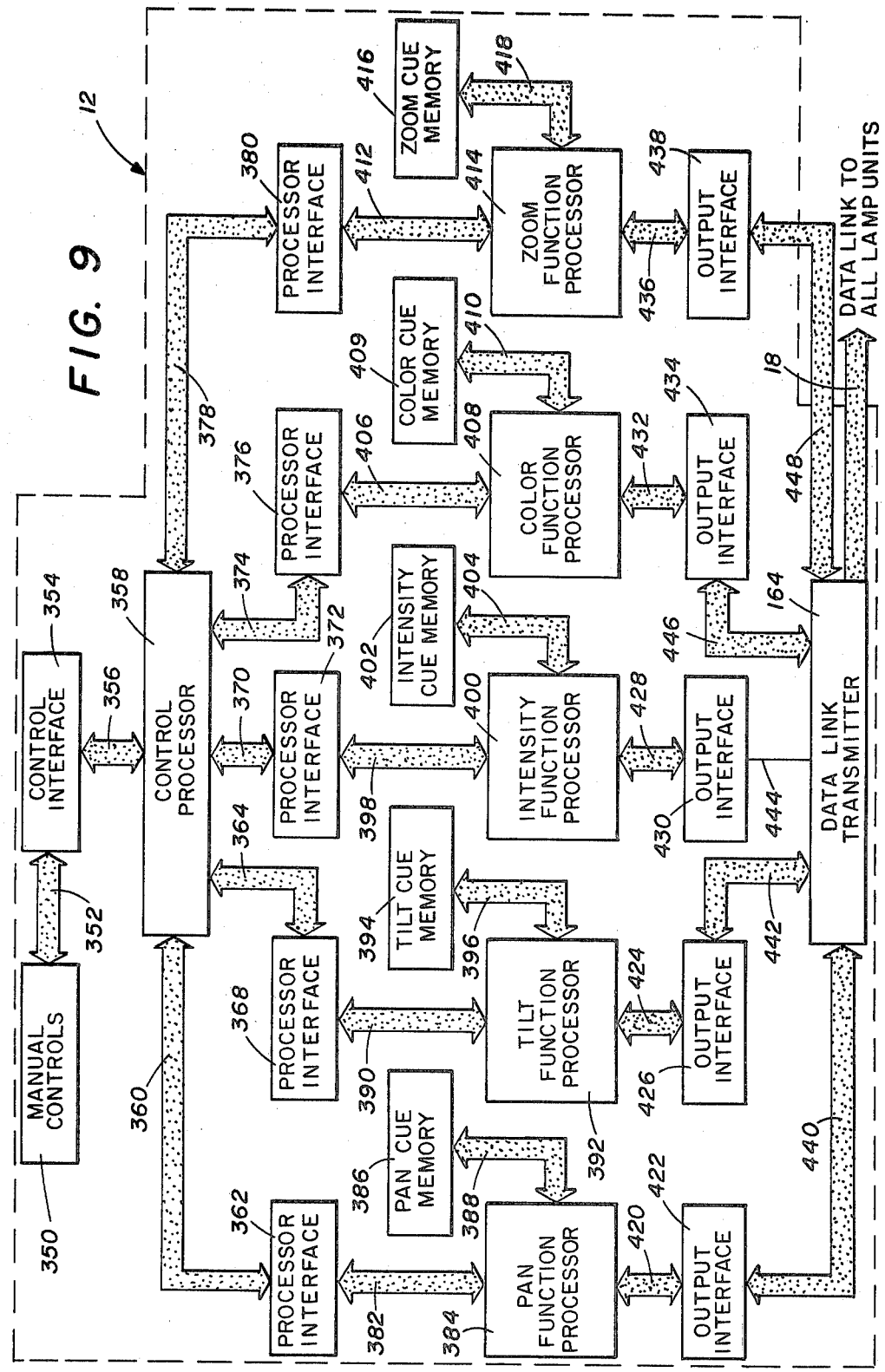
FIG. 9 is a general schematic of the control panel of the lighting system.

A general schematic of the control panel 12 of the present invention is disclosed in FIG. 9. The manual controls 350 represent the various switches, buttons, visual displays and sliding controls such as illustrated in FIG. 6. The manual controls 350 are interconnected by a bus 352 to a control interface 354. The control interface 354 continuously scans the setting of the manual controls 350 and communicates through a data bus 356 to the control processor 358.

The control panel 12 operates in two separate modes. In the program mode, information is input by the manual control 350 representing the desired position, color, divergence and intensity of the lights 14 for each cue during the show. In the operate mode, the control processor 358 is responsible for recalling the settings of the variable functions from various memories within the control panel and directing the remainder of the control panel to set each light 14 with the proper setting for each cue in sequential order when requested by the operator through the manual controls 350.

In the program mode, the control processor 358 will direct information representing the desired setting for a variable function to one of the five variable function processors. For example, the panning function includes a data bus 360 interconnecting the control processor 358 and a processor interface 362. A bus 382 interconnects the processor interface 362 with the pan function processor 384. A pan cue memory 386 is interconnected with the pan function processor 384 by a data bus 388. Information input to the control processor 358 regarding the panning function will be transmitted along the bus 360, through processor interface 362 and into pan function processor 384 through bus 382. The control processor 358 may direct the pan function processor 384 to store the information in the pan cue memory 386. Similar bus lines 364, 370, 374 and 378 interconnect the control processor 358 with processor interfaces 368, 372, 376 and 380. The processor interfaces 368, 372, 376 and 380 are interconnected through bus lines 390, 398, 406 and 412 to the tilt function processor 392, intensity function processor 400, color function processor 408 and zoon function processor 414. The tilt cue memory 394, intensity cue memory 402, color cue memory 409 and zoom cue memory 416 are interconnected with the associated function processors by data buses 396, 404, 410 and 418.

In the operation mode, where the control processor 358 is commanded to direct the remainder of the control panel 12 to set the variable functions to values retained in each cue memory, control processor 358 acts as an interface between each of the individual function processors 384, 392, 400, 408 and 414. The control processor 358 will direct each function processor to recall from memory the setting of the variable function for a particular cue and direct this information through a bus line 420, 424, 428, 432 or 436 to an output interface 422, 426, 430, 434 or 438. Each of the output interfaces is connected by a bus line 440, 442, 444, 446 or 448 to the data link transmitter 164. The data link transmitter 164 converts the parallel data output from the output interfaces to a serial data. It also acts to order the information for each address representing a light or series of lights in a preset order so that each variable function setting is represented by a known position in the stream of data. The data link transmitter 164 then directs the information in serial form along the data link or signal cable 18 to the various receivers 166 associated with each light.

Figure 10A:
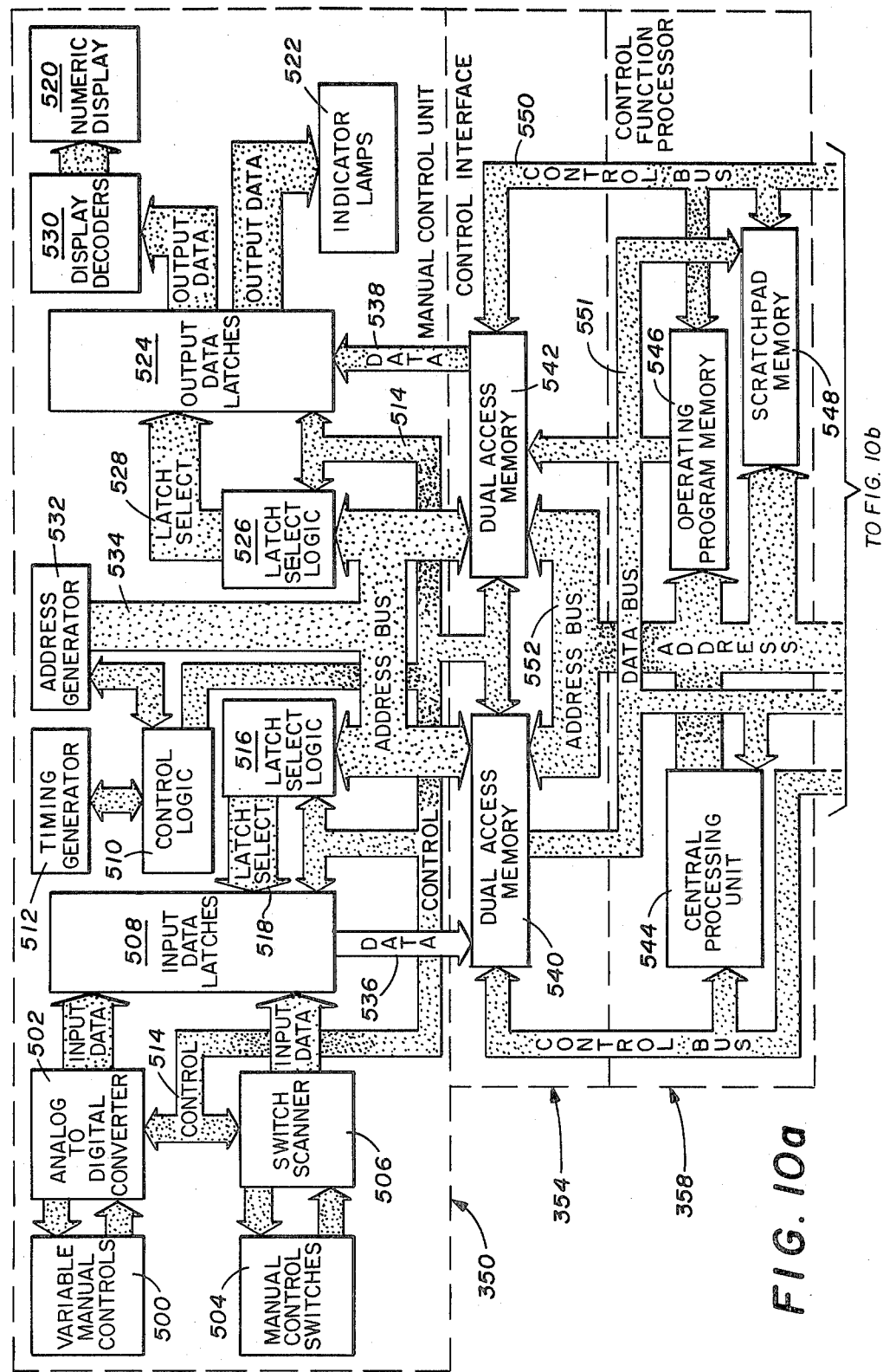
Figure 10B:
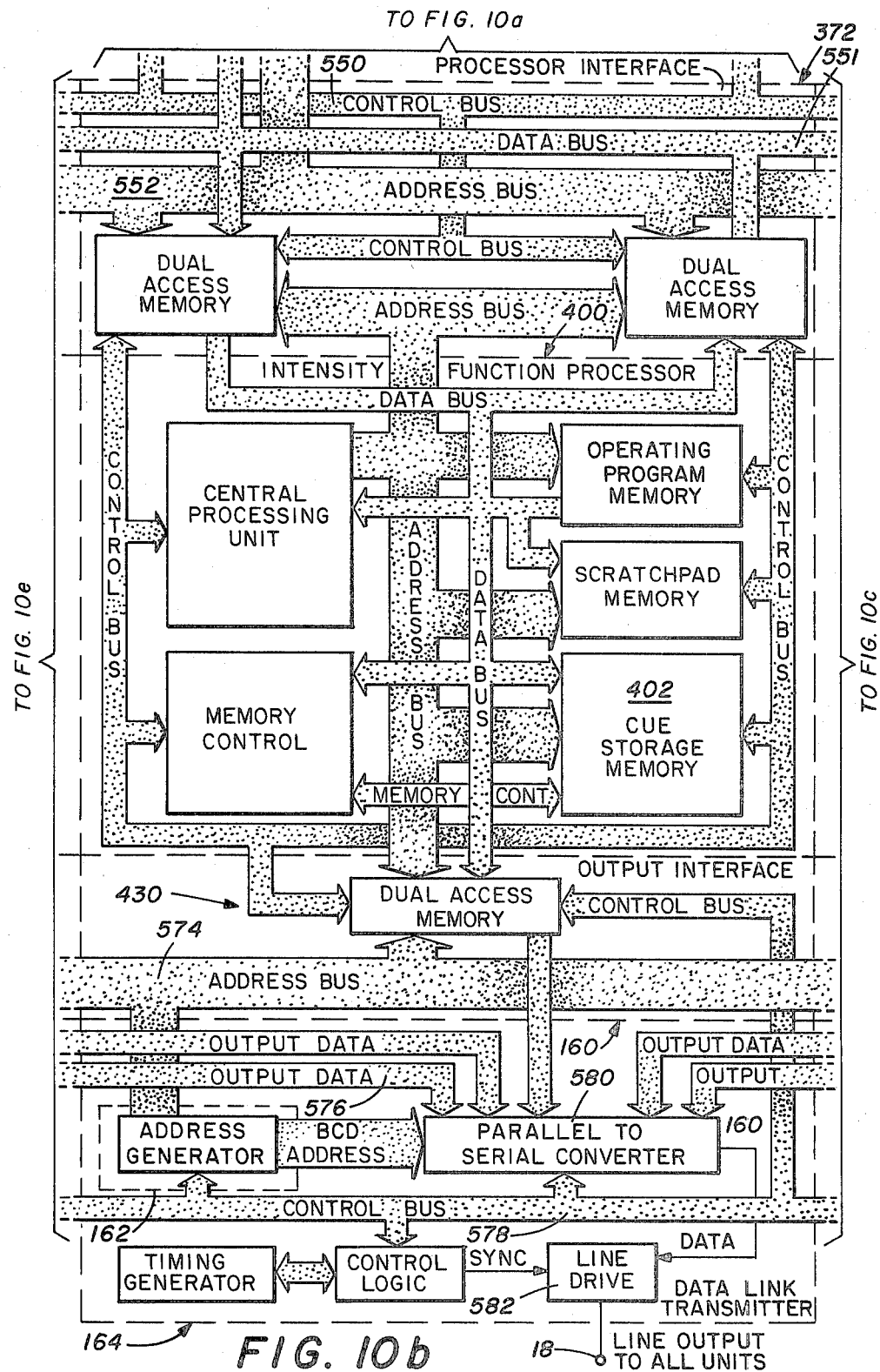
Figure 10D:
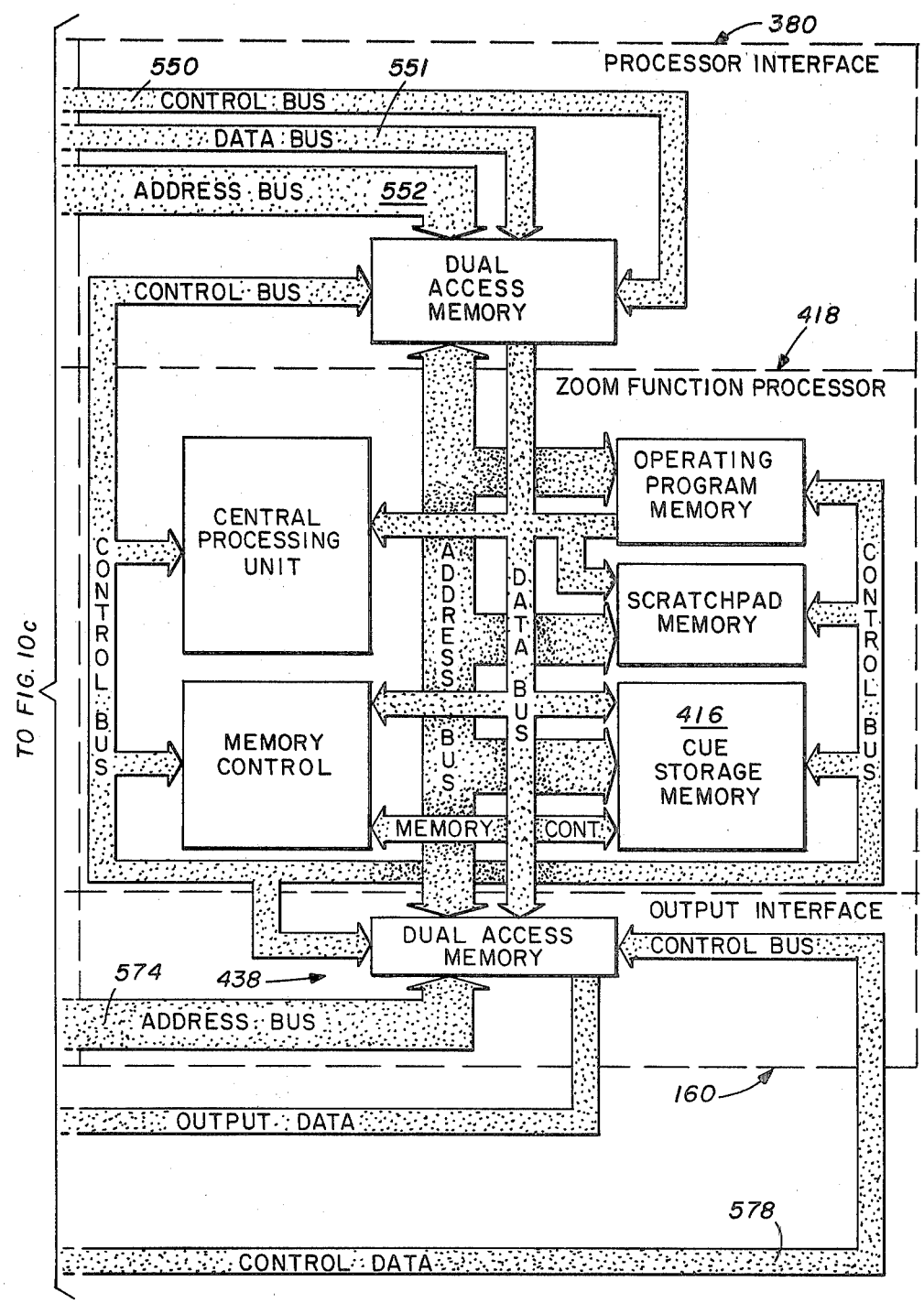
Figure 10E:
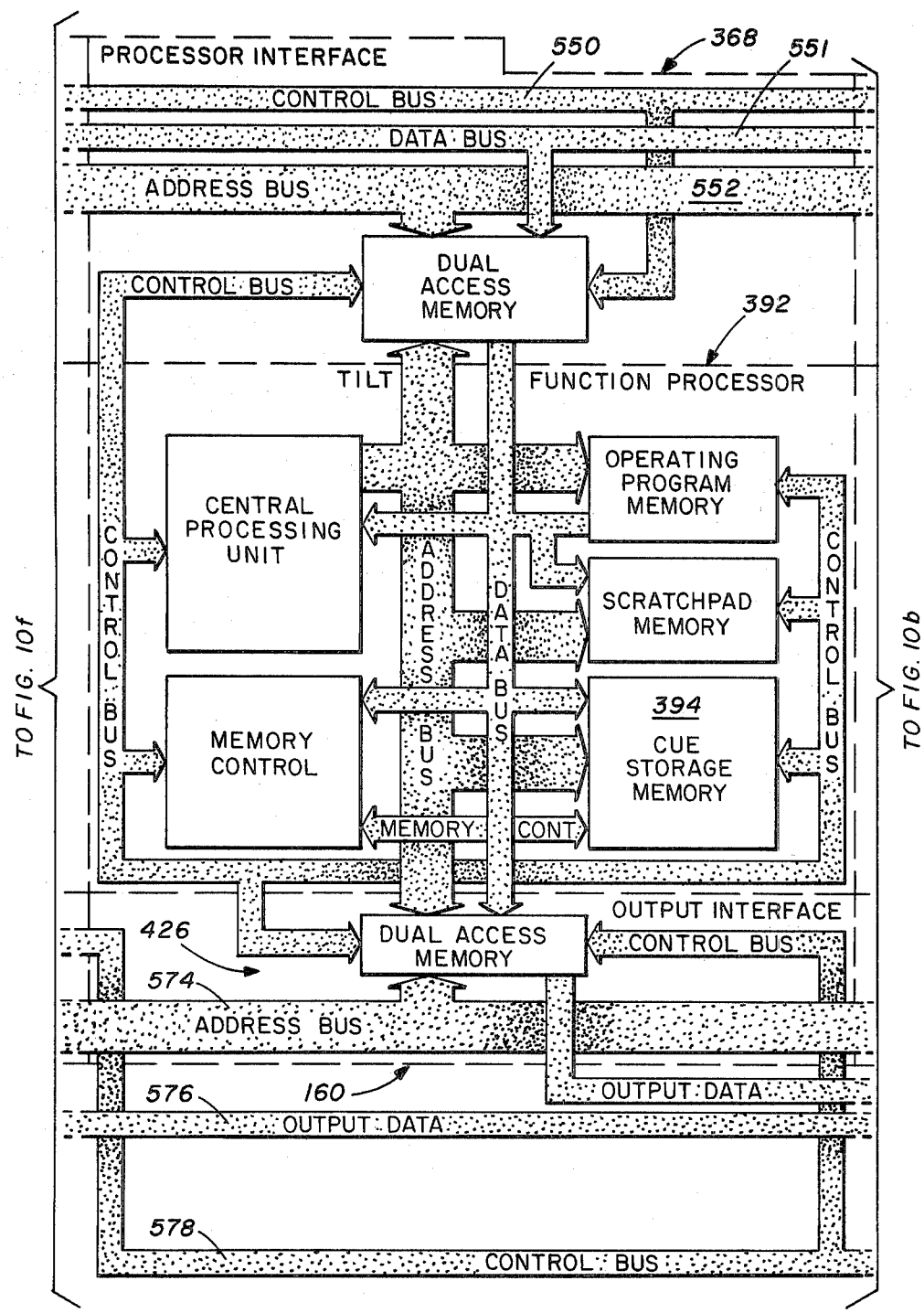
Figures 10F, 11:
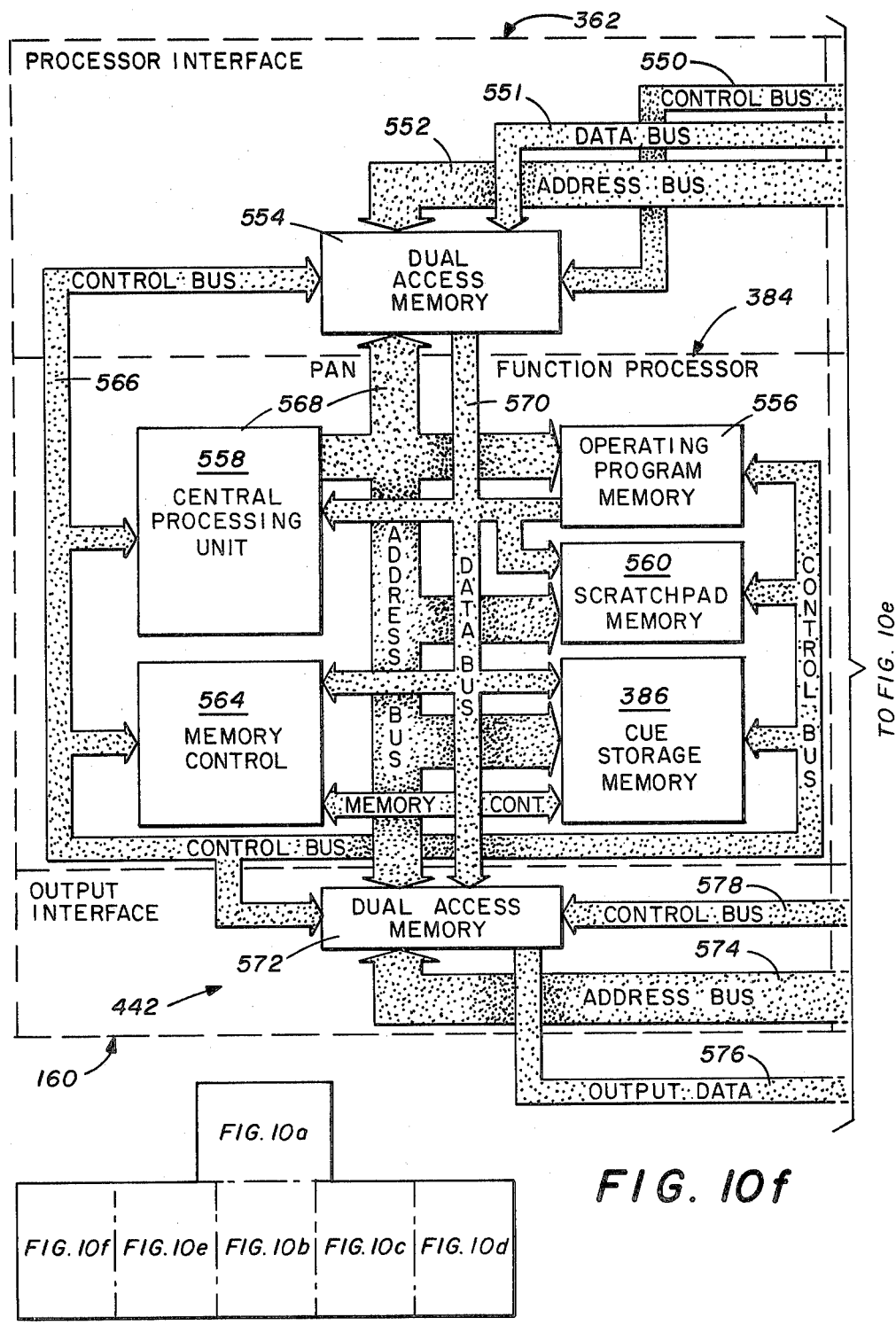

FIGS. 10a, b, and c illustrate in greater detail the schematic of the control panel 12 of the present invention. The components illustrated in FIG. 9 or again illustrated in FIG. 10 within dotted lines. The bus lines interconnecting the components of FIG. 9 generally form the bus line extending across the dotted lines in FIGS. 10a, b and c. The manual controls 350 include the variable manual controls 500, such as rotary or linear potentiometers. These controls are fed into an analog to digital converter 502. The manual control switches 504 are sequentially scanned by a switch scanner 506. The input data is transferedto input data latches 508. A control logic 510 having a timing generator 512 connected thereto and a control bus 514 control the operations of the converter 502, scanner 506 and data latches 508 through the latch select logic 516 and latch select bus 518.

The output numerical displays 520 and indicator lamps 522 present output data for indicating to the operator the status of the lighting system 10. The output data travels through output data latches 524 controlled by control logic 510 through a latch select logic 526 and latch select bus 528. A display decoder 530 is required to decode data for display in numeric display 520. An address generator 532 is employed with an address bus 534 to control the operation of the input and output indicators.

The bus 352 illustrated in FIG. 9 comprises the control bus 514, address bus 534 and data buses 536 and 538. These buses enter the control interface 354 which includes dual access memories 540 and 542. The function of dual access memory 540 is essentially to retain the status of the controls and switches on the control panel and update this status in a continuous manner. The operation of dual access memory 542 is essentially to retain the status of the displays and indicator lamps on the control panel, and also update in a continuous manner.

The control processor 358 forms the heart of the lighting system and directs each sub-function representing an individual variable function such as panning, tilting, intensity, color and beam divergence as zoom. The control processor 358 includes a central processing unit 544, an operating program memory 546 and a scretch pad memory 548. Control bus 550 and address bus 552 interconnect the control interface, control processor and individual function processors, and act to form the bus lines 356, 360, 364, 370, 374 and 378 of FIG. 9. The operating program memory 546 contains instructions necessary for the central processing unit 544 to control the lighting system. The central processing unit 544 directs input information to the individual function processors or directs the individual processors to recall from memory the setting of the variable function. The central processing unit 544 also directs information back through the dual access memory 542 for visual display to the operator of the status of the system.

The function of only one processor interface, function processor, cue memory and output interface will be described as the others are substantially identical. The dual access memory 554 acts as the processor interface 362 between the control processor 358 and pan function processor 384. The operating program memory 556 within pan function processor 384 directs the central processing unit 558 to control the panning function. A scratch pad memory 560 is provided which forms a random access memory. The cue storage memory 386 stores the entire block of data representing the panning function for each light for every cue during a show. The relative complexity of cue storage memory 386 requires a memory control 564 for proper operation with the other components in the pan function processor. The control bus 566, address bus 568 and data bus 570 interconnect the various components of the pan function processor as indicated as well as the dual access memory 554 and the dual access memory 572 forming the output interface 422 as shown in FIG. 9. The intensity and color function processors 400 and 408 differ by having twin dual access memories comprising the processor interface between control processor 358 and the function processor. This is necessary as the cross fade controls and preset colors require feedback to the control processor for proper operation.

The dual access memory 572 forming the output interface of the pan function processor is connected to the address bus 574, the output data bus 576 and a control bus 578. These buses enter the data link transmitter 164 and extend to the output interfaces of the other function processors for tilt, intensity, color and zoom. The parallel to serial converter 580 within the data link transmitter translates the parallel format data from the individual function processors to a ordered serial data form for transmission over the data link or signal cable 18 connected to the transmitter through a line driver 582. The signal transmitted along data link 18 is a bipolar signal. That is, positive, negative and zero voltage level signals are employed. A negative voltage signal is provided as a synchronization pulse between the transmitter and receivers. The negative voltage signal precedes each block of serial data representing the address of a selected light and the data representing the setting of the variable functions. The receivers sense the negative voltage signal to synchronize the processing of the serial data by each receiver to the transmitter.

In the preferred embodiment, each operating program memory such as 546 and 556 within the control panel 12 comprises a 64 kilobit memory Model 2716 sold by Mostek Corporation of Carrollton, Tex. and its associated hardware. Each scratch pad memory such as 548 and 560 is preferably formed of a four kilobyte random access memory sold as Model 4118 by Mostek Corporation of Carrollton, Tex. The cue storage memory for each of the function processors is preferably an 8 kilobyte electrically alterable read only memory such as sold by General Instruments of Hicksville, N.Y. as Model ER 3400. The central processing units such as 544 and 558 within control panel 12 are preferably Model 1802 sold by the Radio Corporation of America of Somerville, N.J. The dual access memories such as 554 and 572 within the control panel 12 are preferably formed of a series of multiport registers Model No. 74LS170 such as sold by Texas Instruments of Dallas, Tex. While the lighting system 10 forming the present invention may be constructed with the components noted above, it would be obvious to one skilled in the art to replace or substitute the components with other components to perform substantially the same function.

Figure 8:
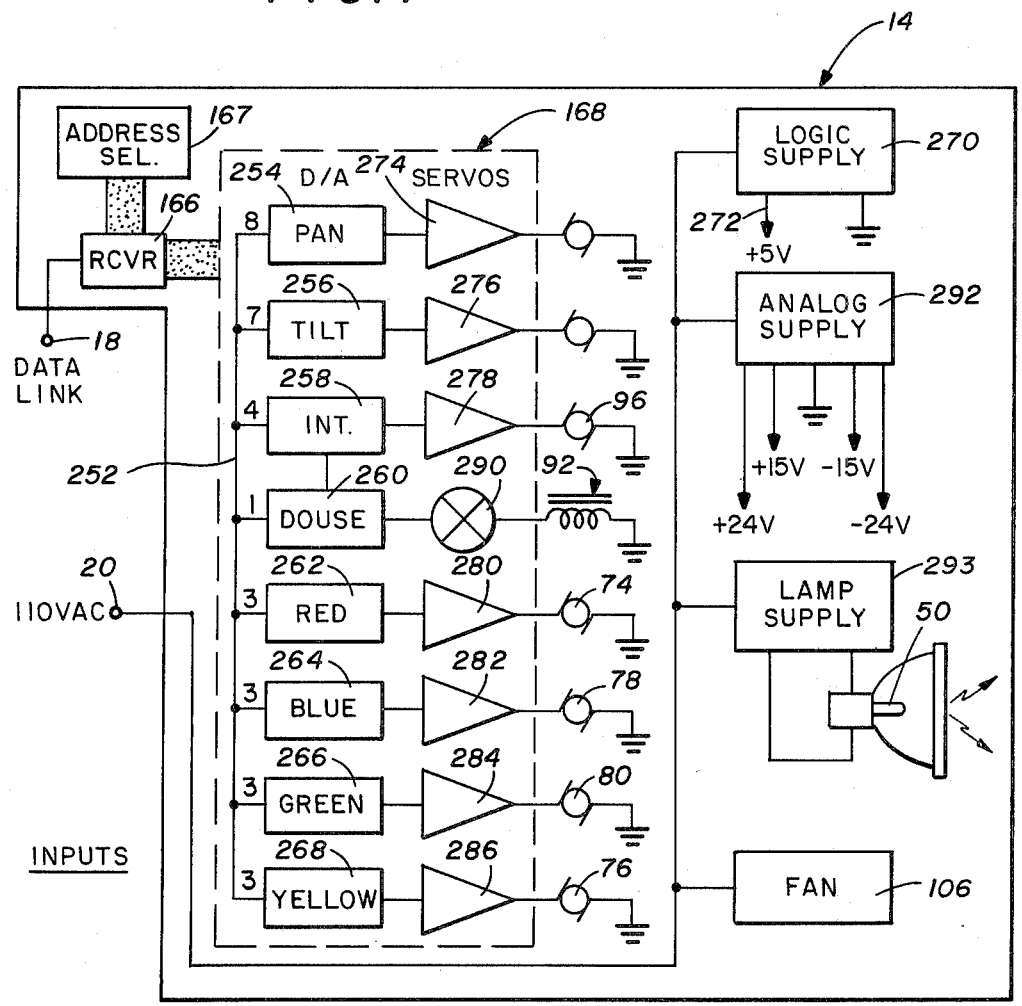
FIG. 8 is a schematic of the servo drive components associated with each light source.

The schematic of the receiver 166 and servo drive 168 and associated mechanisms within the light source 14 are illustrated in FIG. 8. Information representing the desired settings for a selected light source is transmitted as serial data along the signal cable 18. The address select 167 is preprogrammed to select the address of the light source to which it is associated. If the information transmitted along the signal cable 18 does not contain the proper address, the information is rejected by the address select. If the information does contain an address corresponding to the address preprogrammed, the remainder of the serial data, containing the information for setting the light source is transmitted along a line 252 to a series of digital-to-analog converters 254 through 268. The numbers beside each converter represents the number of bits necessary to communicate the setting of the variable function. The digital-to-analog converters translate portions of the serial data transmitted along the data line 18 to analog voltage signals. The digital-to-analog converter 254 controls the panning mechanism of the associated light source 14 and requires 8 bits of information for operation. The number of bits noted for each variable function in FIG. 8 may be varied to achieve the desired resolution. For example, 8 bits of data may be used to position each dichroic filter which increases the precision in positioning the filter. A logic supply 270 connected to the 110 volt AC power input line 20 provides a power output 272 to operate the digital-to-analog converters.

The voltage signal produced by each converter is transmitted to an amplifier 274 through 286 for amplification and further transmitted to the associated servo motor. In the case of the douser unit 90, a current amplifier 290 is interconnected with the digital-to-analog converter 260 to operate the solenoid 92. Each of the servo motors is provided with reference voltages from an analog supply 292 so that the voltage signal input from the associated amplifier causes the servo motors to move to a predetermined position. The predetermined position is determined by the relative reference voltage levels provided by analog supply 292 and the voltage input from the amplifier. This circuit therefore provides a method for positioning the light source and determining the color, intensity and beam divergence of the light beam from the light source by use of servo motors providing accurate positioning.

The lamp 50 is provided power through the 110 volt input line 20 and lamp supply 293. A fan 106 may also be provided and interconnected with the power input for cooling the light source during operation.

It can be seen from the description above and the accompanying drawings that the lighting system 10 has automatically variable positioning, color, intensity and beam divergence and utilizes movable dichroic filters for color variance and digital computers with storage for control of all the variable functions. While the embodiment disclosed permits 32 light sources to be independentaly controlled, any number of light sources may be operated by expanding the system. The capacity of lighting system 10 to set the variable functions of a light source from a remote position permits an individual light source to be used in different settings for different cues. Therefore, the typical requirement for 400 separate light sources all prepositioned to light an entire performance may be reduced to as few as 100 light sources 14 controlled be the lighting system 10 to thereby reduce cost. The lighting system 10 also eliminates the need for any dimmers, and associated cables. This vastly simplifies the procedure in setting up stage lighting and eliminates the need for long links of expensive cable. The chop found in AC power lines in conventional lighting systems is also eliminated by the present lighting system 10 and therefore the undersirable noise induced in electronic musical instruments and associated sound reinforcement equipment such as mixing consoles, amplifiers, etc. is reduced.

An operator at the control panel 12 of lighting system 10 may request a particular cue to be recalled from memory and each function of the light source for that cue to be set. The operator may adjust the variable functions for each of the light sources from control panel 12. The present invention therefore eliminates the slow process of positioning lights manually, setting colored gels and other steps in preparing a performance. The variable functions for every light source may be reset at any time, even during a performance. The lighting system 10 also permits the operator to vary the functions of individual light source selected even during a performance from the control panel.

Although several embodiments of the invention have been illustrated in the accompanying Drawings and described in the foregoing Detailed Description, it will be understood that the invention is not limited to the embodiments disclosed, but is capable of numerous rearrangements, modifications, substitution of parts and elements without departing from the spirit of the invention.

I claim:

1. A lighting system comprising:
   a plurality of light surces for producing directable beams of light, each said light source pivotally mounted to a support member;
   at least one dichroic filter pivotally mounted for pivotal motion in each said light beam for transmitting light of a preselected color, the angle of incidence of the light on the dichroic filter being variable to alter the saturation and hue of light transmitted as the dichroic filter is pivoted;
   means for pivoting each said dichroic filter;
   pivoting means for pivoting each said light source to a preselected position;
   controller means for input of information including unique coded addresses each representing a different selected one of said light sources and data representing the preselected position and color of said selected one of said light sources;
   transmitter means for transmitting the information;
   a communications channel coupled to said transmitter means for carrying all of said information; and
   receiver means coupled at spaced apart locations to said communications channel and associated with each of said light sources for receiving the information and reading the coded addresses, each said receiver means responsive to only one of coded addresses for reading the positioning and color data and activating said pivoting means to pivot said selected one of said light sources to the preselected position and further controlling said dichroic filter pivoting means to select the desired color of the light beam.

2. The lighting system of claim 1 further comprising means for storing the information input to said controller means, the information being recalled by said controller means to pivot said selected one of said light sources to the preselected position upon input of a recall command.

3. The lighting system of claim 1 further comprising dimmer means for varying the intensity of the light beam from said light sources, the input information including data representing the desired intensity for said selected one of said light sources, said receiver means activating said dimmer means to vary the intensity of the light beam to the desired level.

4. The lighting system of claim 3 wherein said dimmer means is capable of varying the intensity of the light beam until the light beam is blocked.

5. The lighting system of claim 1 further comprising means for varying the divergence of the light beam from said light sources, the input information including data representing the desired divergence for said selected one of said light sources and said receiver means activating said means for varying the divergence to provide the desired divergence to the light beam of said selected one of said light sources.

6. A lighting system comprising:
a plurality of light sources for producing directable beams of light, each of said light sources mounted in a frame means for pivotal motion in a horizontal plane and a vertical plane;
a panning mechanism associated with each of said light sources for pivoting said light source in the horizontal plane;
a tilting mechanism associated with each of said light sources for pivoting said light source in the vertical plane;
first color wheel means rotatably mounted on each said frame means and having at least one dichroic filter mounted in the periphery thereof;
first motor means for rotating said first color wheel means to position the dichroic filter across the light beam emanating from said light source;
second color wheel means spaced from said first color wheel means and rotatably mounted on each said frame means and having at least one dichroic filter mounted in the periphery thereof;
second motor means for rotating said second color wheel means to position the dichroic filter across the light path to transmit a preselected color;
means for controlling the rotation of said motor means to position dichroic filters across the light beam to provide permutations of color emanating from each said light source such that an optical bandpass structure is formed;
a controller for input by an operator of information including a digital coded address representing a selected one of said light sources and digital data representing the desired position of said selected one of said light sources in the horizontal and vertical planes;
a memory for storing the input information for each of said light sources, said controller permitting the operator to select the information to be stored and selectively recalling the stored information;
an asynchronous transmitter for transmitting the input or recalled information for the selected one of said light sources along a communications channel; and
an asynchronous receiver associated with each of said light sources and coupled to said communications channel, each of said receivers associated with each of said light sources receiving each coded address within the transmitted information, only the receiver associated with said selected one of said light sources responsive to said coded address for activating said panning and tilting mechanisms to pivot said selected one of said light sources to the desired position and for controlling said motor means for providing a light beam of a selected color.

7. The lighting system of claim 6 further comprising a dimmer mechanism for varying the intensity of the beam of light from each of said light sources, the information input to said controller including data representing the desired intensity for said selected one of said light sources and the receiver associated therewith operating said dimmer mechanism to provide the desired intensity to the light beam.

8. The lighting system of claim 6 further comprising a mechanism for varying the divergence of the light beam from each of said light sources, the information input to said controller including data representing the desired divergence of the light beam of said selected one of said light sources, the receiver associated therewith operating said mechanism to provide the desired divergence of the light beam.

9. A light source for producing variable color light useful to light an area comprising:
frame means;
lamp means for producing light positioned within said frame means, the light produced forming a light path within said frame means;
at least one dichroic filter pivotally mounted within said frame means for pivotal motion in the light path for transmitting light of a preselected color, the angle of incidence of the light on the dichroic filter being variable to alter the saturation and hue of light transmitted as the dichroic filter is pivoted; and
means for pivoting said dichroic filter in order to produce light of any one of a number of colors.

10. The light source of claim 9 wherein said lamp means includes a reflector for reflecting light incident thereon along the light path.

11. The light source of claim 9 further comprising collimating means for aligning the light in the light path in a parallel manner.

12. The light source of claim 9 further comprising focusing means for focusing the light in the light path to illuminate a desired area.

13. The light source of claim 9 further comprising douser means for preventing light from emanating from the light source.

14. The light source of claim 9 further comprising dimmer means for varying the intensity of the light beam emanating from the light source.

15. The light source of claim 9 further comprising positioning means for interconnecting the frame means and a fixed member for moving said frame means to direct the produced beam of light to a desired area.

16. The light source of claim 6 wherein each said light source further comprises an elliptical reflector for reflecting light incident thereon for convergence at a focus, said color wheel means being rotatable to position the dichroic filter across the light path adjacent the focus to minimize the area of the dichroic filter.

17. The light source of claim 6 wherein each said color wheel means includes a plurality of dichroic filters mounted in the periphery thereof to permit light beams of varied color to emanate from said light source and having at least one opening without a dichroic filter to permit a white light beam to emanate from said light source.

18. The light source of claim 6 further having a gobo wheel rotatably mounted on said frame means having a slide having a predetermined image formed thereon and including means for rotating said gobo wheel to position the slide across the light path to project the image in the light beam emanating from said light source.

19. The light source of claim 6 further comprising a light intensity wheel rotatably mounted on said frame means having portions transmitting preselected precentages of the light incident thereon, said light source further comprising means for rotating said light intensity wheel to position a selected portion of said light intensity wheel across the light beam to vary the light intensity of the light beam emanating from said light source.

20. The light source of claim 6 further comprising a light intensity wheel rotatably mounted on said frame means having a plurality of reflective mirrors, each of said mirrors permitting a preselected percentage of the light incident thereon to be transmitted therethrough, said light source further comprising means for rotating said light intensity wheel to position selected ones of said mirrors across the light path to vary the light intensity of the light beam emanating from said light source.

21. The light source of claim 6 further comprising lens means for varying the divergence of the light beam emanating from said light source.

22. A lighting system for lighting an area comprising:
at least two light sources for producing a directable beam of light and having a plurality of variable functions including position and color;
manual controls for inputting information representing the desired value for each of the variable functions and an address code for a selected one of said light sources for a selected cue in a sequential series of cues;
a control processor means for processing the input information;
a control interface means for interfacing between said manual controls and said control processor means;
a function processor means associated with the variable functions for processing the input information representing that function and the address code, said control processor means directing the input information for each function to the associated function processor means;
processor interface means for interfacing between said control processor means and said function processor means;
a functure cue memory means associated with said function processor means for storing digital representations of the input information representing the address code and the desired value of the variable function for each of said light sources for each cue in the series;
data transmitter means;
output interface means interconnecting said function processor means and said data transmitter means, said data transmitter means translating information from each of said function processor means representing the desired value for each of the variable functions and the address code of said selected one of said light sources to serial data;
data receiver means associated with each of said light sources;
a data link interconnecting said data transmitter means and each of said data receiver means for transmission of the serial data representing the coded address and the desired value of each of the variable functions, each of said data receiver means response to a different coded address transmitted along said data link, the data receiver means associated with said selected one of said light sources activating said selected one of said light sources to set the variable functions to the desired values represented by the serial data; and
the control processor means directing said function processor means to recall the desired value for each of the variable functions for each of said light sources for a selected cue and transferring the recalled values to said data transmitter means for transmission along the data link in response to a command input by the operator to said manual controls, said control processor means automatically sequencing the cues upon command by the operator.

23. The lighting system of claim 22 wherein the variable functions including varying the color of the light beam, intensity of the light beam, divergence of the light beam and the position of the light source for each of the light sources.

24. The light source of claim 9 further comprising a plurality of additional dichroic filters similar to said one dichroic filter but with different optical properties such that said additional filters pass a different portion of the light spectrum.

25. The lighting system of claim 1 and further comprising:
means for homogenizing the light passing through each dichroic filter with light passing around said dichroic filter to produce a light beam of uniform color.

26. The light source of claim 9 and further comprising:
means within said frame means for homogenizing the light passing through said dichroic filter with light passing around said dichroic filter to produce a light beam of the uniform color for projection on an area.

27. The light source of claim 9 and further comprising:
a plurality of said light sources;
controller means for input of information including unique coded addresses each representing a different selected one of said light sources and data representing the preselected color emanating from said selected one of said light sources;
transmitter means for transmitting the information;
a communications channel coupled to said transmitter means for carrying said information;
receiver means coupled at spaced apart locations to said communications channel and associated with each of said light sources for receiving the information and reading the coded addresses, each said receiver means responsive to only one of coded addresses for reading the color data and activating said pivoting means to pivot said dichroic filter of said light source to a selected position.

* * * * *

UNITED STATES PATENT AND TRADEMARK OFFICE
CERTIFICATE OF CORRECTION

PATENT NO. : 4,392,187
DATED : July 5, 1983
INVENTOR(S) : James M. Bornhorst

It is certified that error appears in the above-identified patent and that said Letters Patent is hereby corrected as shown below:

Column 8, line 42, "source" should be --sources--;
          line 44, "source" should be --sources--.
Column 11, line 34, "transferedto" should be --transfered to--;
          line 67, "scretch" should be --scratch--.
Column 14, line 45, "surcer" should be --sources--.

Signed and Sealed this

Seventeenth Day of April 1984

[SEAL]

Attest:

GERALD J. MOSSINGHOFF

Attesting Officer     Commissioner of Patents and Trademarks